United States Patent
Okamoto et al.

[11] Patent Number: 5,852,952
[45] Date of Patent: Dec. 29, 1998

[54] BUFFER DEVICE FOR TRANSMISSION OPERATING BOOSTER

[75] Inventors: Isao Okamoto; Jun Kajinami, both of Ageo; Kazunari Imasato, Yono, all of Japan

[73] Assignees: Nissan Diesel Motor Co., Ltd.; Sanwa Seiki Ltd., both of Saitama-ken, Japan

[21] Appl. No.: 798,948

[22] Filed: Feb. 11, 1997

[30] Foreign Application Priority Data

Mar. 29, 1996 [JP] Japan .................................. 8-077437

[51] Int. Cl.$^6$ .............................. F16H 9/14; F16J 15/32
[52] U.S. Cl. ................. 74/473.11; 277/552; 188/322.16
[58] Field of Search .......................... 74/473.11, 473.29; 277/552, 563; 188/322.16, 322.17, 322.18

[56] References Cited

U.S. PATENT DOCUMENTS

| 4,337,956 | 7/1982 | Hopper | 277/29 |
|---|---|---|---|
| 4,483,377 | 11/1984 | Cubalchini | 277/3 X |
| 4,936,156 | 6/1990 | Peterson et al. | 74/473.11 X |
| 5,142,927 | 9/1992 | Amedei et al. | 74/473.11 X |

FOREIGN PATENT DOCUMENTS

| 3-93650 | 9/1991 | Japan . |
|---|---|---|
| 3-93651 | 9/1991 | Japan . |
| 5-42784 | 6/1993 | Japan . |
| 5-61559 | 8/1993 | Japan . |

Primary Examiner—Rodney H. Bonck
Assistant Examiner—David M. Fenstermacher
Attorney, Agent, or Firm—McDermott, Will & Emery

[57] ABSTRACT

A transmission operating apparatus includes a booster for increasing the transmission operating force, and a buffer device for suppressing rapid shift-changes caused by a change in the load due to the damper action of a hydraulic damper mechanism. A by-pass is incorporated into the buffer to permit working fluid to flow into damper chamber by-passing an orifice when necessary. A sealing member having a sealing portion is interposed in the by-pass to seal the by-pass under normal conditions but is resiliently deformed releasing the seal when the working fluid flows into the damper chamber.

10 Claims, 5 Drawing Sheets

BUFFER DEVICE FOR TRANSMISSION OPERATING BOOSTER

BACKGROUND OF THE INVENTION

1. Field of the Invention

The present invention relates to an apparatus for operating a transmission and more particularly, to technology for improving the shift feeling produced thereby.

2. Description of the Related Art

In transmissions for large vehicles such as a trucks, it is known to employ a booster operated on compressed air to decrease the force required to control shifting, particularly, during the synchronizing operation where a large operation force is required (see Japanese Unexamined Utility Model Publication Nos. 3-93650 and 3-93651).

However, when the synchronizing operation is finished, the load of the booster abruptly decreases, and the compressed air in the booster is permitted to quickly expand, whereby the piston is rapidly displaced. As a result, the shifting operation is completed extremely rapidly irrespective of the driver's intention and control. This of course deteriorate the feeling of the shift. Moreover, since the shifting operation is completed so quickly, impact loads are imparted to the links in the operation system and to the transmission as a whole.

In order to resolve this problem, there has heretofore been proposed to provide a buffer device such as oil damper of the type disclosed in Japanese Unexamined Utility Model Publication, Nos. 5-61559 and 5-42784.

However, these conventional hydraulic buffer devices include a check valve which is provided to decrease the flow-in resistance of the hydraulic (operation) fluid, so that the operation fluid flows out of one damper chamber via an orifice while operation fluid quickly flows into the other damper chamber. This, type of arrangement however, renders it difficult to achieve small compact arrangement and has accordingly tended to be overly bulky as a result.

SUMMARY OF THE INVENTION

In view of the above-mentioned problems inherent in the prior art, the object of the present invention is to provide an apparatus for operating a transmission which is both simple and small.

It is a further object to provide an apparatus for operating a transmission which is equipped with a booster and a hydraulic buffer device, wherein the buffer device does not use a check valve having a steel ball or the like, as a valve element.

Another object of the present invention is to stabilize the damper performance by properly maintaining the liquid level of the operation fluid, and to simultaneously decrease the weight and the cost, by greatly simplifying the housing of the buffer device.

A further object of the present invention is to improve the reliability of the sealing function by preventing the sealing member which seals the interior of the booster and the sealing member which seals the interior of the damper chambers from losing their respective sealing functions.

In order to accomplish the above-mentioned objects, the apparatus for operating a transmission of the present invention comprises a booster for boosting the transmission operation force, and a buffer device for suppressing a rapid shift-change operation caused by a change in the load due to the damper action of a hydraulic damper mechanism. The damper mechanism comprises a damper chamber into which the operation or working fluid flows via an orifice. A by-pass through which the operation fluid can additionally flow into the damper chamber in a manner by-passing orifice, is provided and includes a sealing member interposed in the by-pass. This sealing member has a sealing portion to seal the by-pass under normal conditions inclusive of when the operation fluid flows out from the damper chamber, and to be deformed for releasing the sealing only when the operation fluid flows into the damper chamber, and the flow is excessively restricted due to the position of the piston which partitions the damper mechanism and defines the damper chamber.

According to this arrangement, when the operation fluid flows out of the damper chamber, the damper action is produced by the flow resistance produced by the orifice. When the operation fluid flows into the damper chamber, on the other hand, the operation fluid flows through the orifice and the by-pass. Therefore, no check valve having a steel ball or the like valve element is required. Therefore, the buffer device is small and simple in structure. Since the by-pass is opened and closed by the sealing member, the operation fluid quickly flows into the damper chamber even though a negative pressure produced in the damper chamber is relatively small.

The damper mechanism may produce the damper action in both directions in which the piston slides within a cylinder by duplicating the by-pass for the chambers which are defined on either side of the piston.

Further, since the damper action is produced in both directions in which the piston moves, the shift-change operation due to a change in the load can be effectively suppressed irrespective of the direction of the shift-change operation force which it transmitted as a linear motion.

Moreover, the by-pass is formed in a seal housing which closes both ends of the cylinder that constitutes the damper chamber.

In accordance with the above type of construction, the by-pass is easily formed, and the structure of the apparatus for operating the transmission is simplified.

Furthermore, a reservoir unit is provided for storing the operation fluid in a predetermined amount, and is communicated with the exterior of the damper. The reservoir unit couples the booster body and the buffer device in series, and is disposed at an end portion of the booster near the buffer device.

With this construction, the liquid level of the operation fluid is properly maintained at all times, the air is prevented from being mixed or introduced into the damper chamber, and stable damper performance is obtained. With the booster body and the buffer device being connected in series, the apparatus is rendered compact. Further, with the reservoir unit being disposed at one end of the booster body, the housing of the buffer device is simplified, making it possible to reduce weight and to decrease cost.

In coupling the booster body and the buffer device in series, it is preferable to elongate the output shaft of the booster and to provide the buffer device concentrically thereabout.

As a result, the coupling portion is simplified and the whole apparatus for operating the transmission, inclusive of the booster and the buffer device, is compact and exhibits reduced weight and cost.

It is further preferable that space located between the sealing member for sealing the interior of the booster and the sealing member for sealing the interior of the damper chamber, is communicated by a low-pressure portion in which the pressure is lower, at all times, than the pressure of the operation fluid in the damper chamber of when the operation fluid is being displaced out therefrom. The low-pressure portion may be outside of the damper chamber. Alternatively, in a case the operation fluid is not permitted to flow in or out of the above-mentioned space, the low-pressure portion may be defined in the space located externally of the buffer device.

Therefore with this construction according to the invention, the pressure of the operation fluid in the damper chamber does not directly act upon the sealing member, the sealing function is prevented from being impaired, and the sealing function exhibits improved reliability.

BRIEF DESCRIPTION OF THE DRAWINGS

Other objects and advantages of the invention will become clearly appreciated from the following description of embodiments taken in conjunction with the accompanying drawings in which.

PREFERRED EMBODIMENTS

Figure 1:
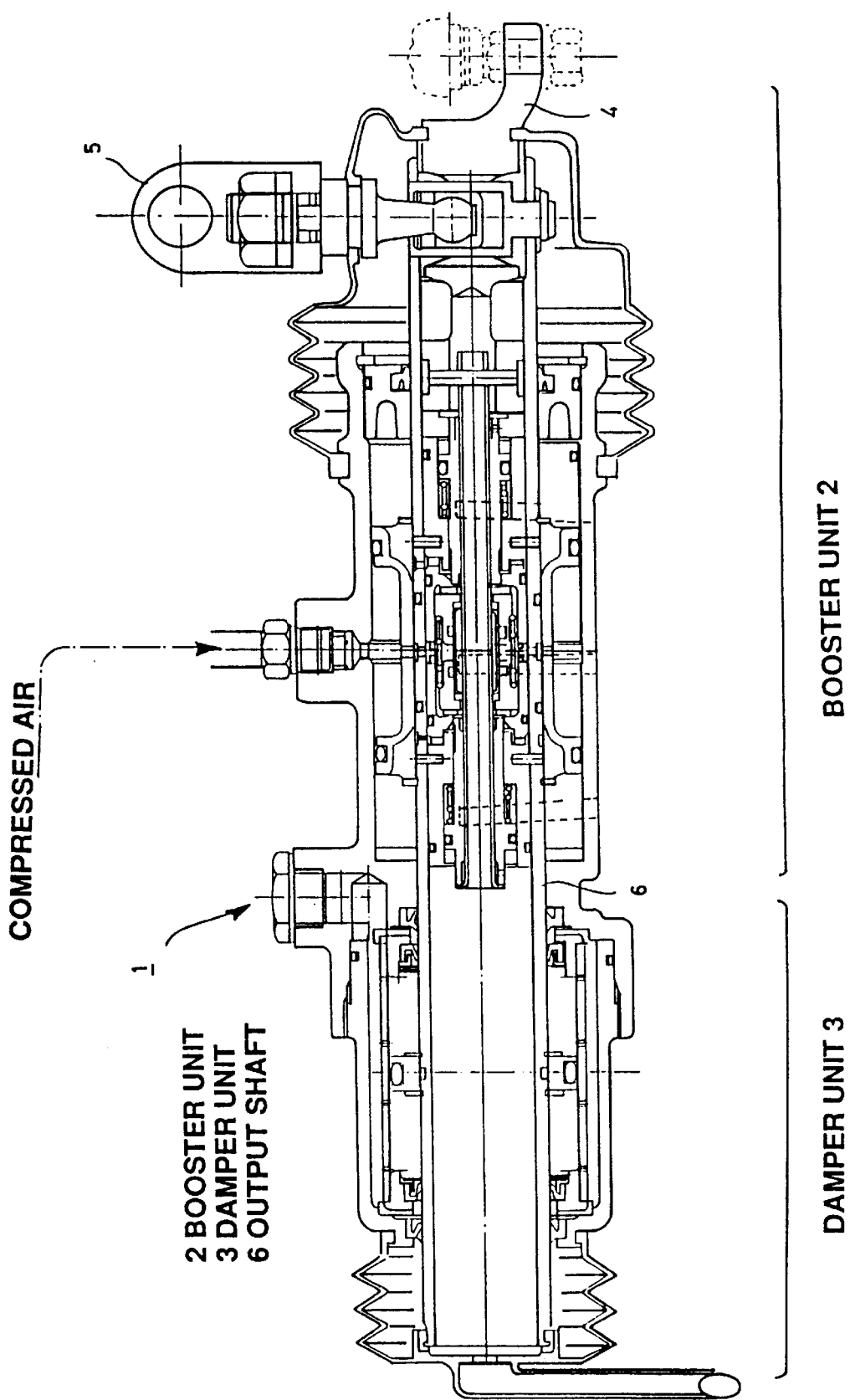
FIG. 1 is a sectional view of a power-shifting device with a damper according to a first embodiment of the present invention.

FIG. 1 illustrate s the whole structure of a "power-shifting device with damper" and shows a booster which incorporates, as a unitary structure, a damper device which incorporate a buffer according to the present invention.

A booster unit 2 constituting the power-shifting device 1 with damper boosts the operation force of a shift lever (not shown) input through an input shaft 4 into an output operation force which is substantially proportional to the input operation force by utilizing the action of the compressed air, and outputs the output operation force to a shift lever 5. A damper unit 3 is provided concentrically with an output shaft (rod) 6 extended from the booster unit 2.

The damper unit 3 is provided concentrically with the extended output shaft 6 on account of the reasons described below.

Figure 5:
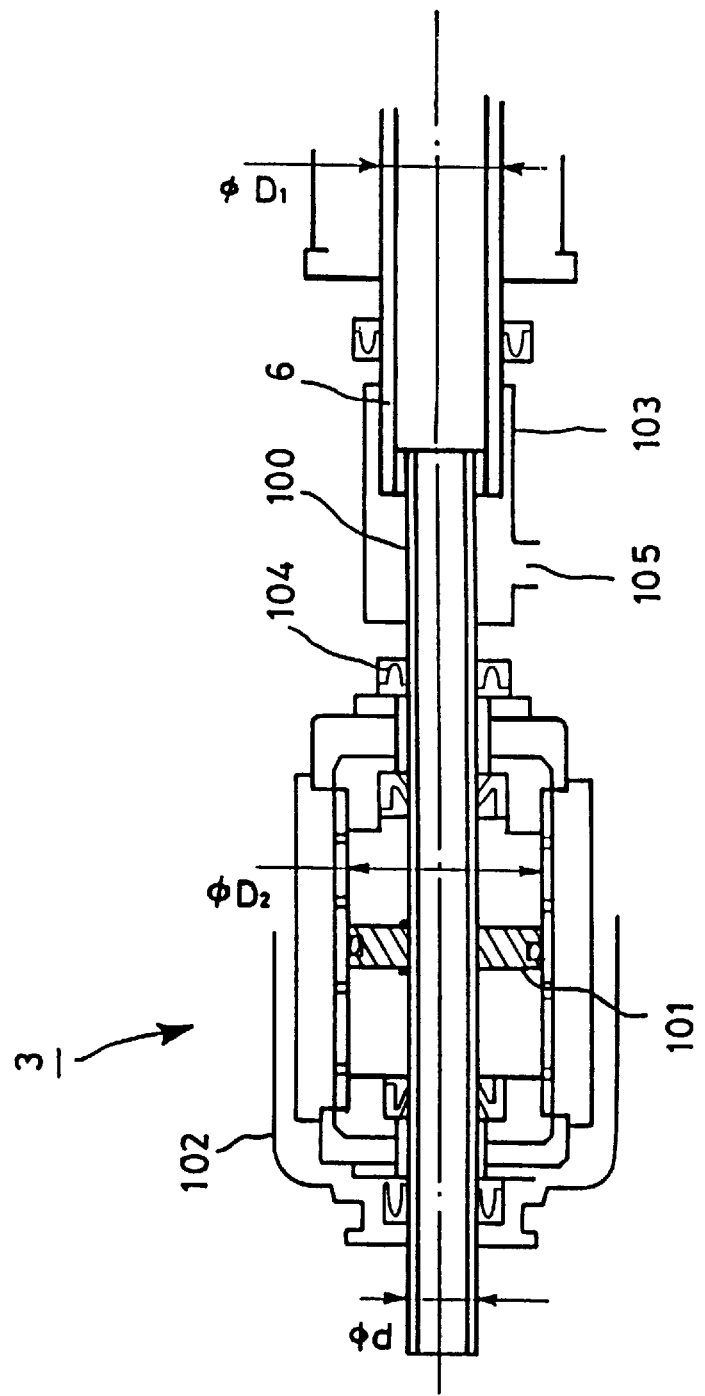
FIG. 5 is a diagram demonstrating the reason why the buffer device arranged concentrically with the output shaft of a booster.

Referring to FIG. 5, for example, when the effective pressure area of a piston 101 in the damper unit 3 is set to be the same, if a shaft 100 of the damper unit 3 has an outer diameter ød which is smaller than an outer diameter øD1 of the output shaft 6, then an outer diameter øD2 of the piston can be set to be smaller than that of when the shaft 100 and the output shaft 6 have the same outer diameter. This provides the advantage in that an outer diameter of a damper housing 102 of the damper unit 3 can be decreased accompanied, however, by the following defects.

(1) The size increases in the longitudinal direction due to the provision of a coupling portion 103 for coupling the output shaft 6 and the shaft 100 having different outer diameters and a seal 104 in the damper unit 3.

(2) In the coupling portion 103, the volume of space varies depending upon the direction of the stroke. Therefore, a filter must be provided to cope with dust in a passage 105 which is open to the atmosphere.

(3) In coupling the output shaft 6 and the shaft 100 together, the play in the axial direction must be minimized to the utmost, requiring a high machining precision.

(4) The number of parts increases e.g. seal 104. filter, etc.

That is, according to the structure depicted in FIG. 5, the power-shifting device 1 including the damper, becomes costly as a whole and is further rendered heavy and bulky. According to the embodiment shown in FIG. 1, therefore, the output shaft 6 of the booster unit 2 is extended, and the damper unit 3 is installed concentrically with the output shaft 6.

Figure 2:
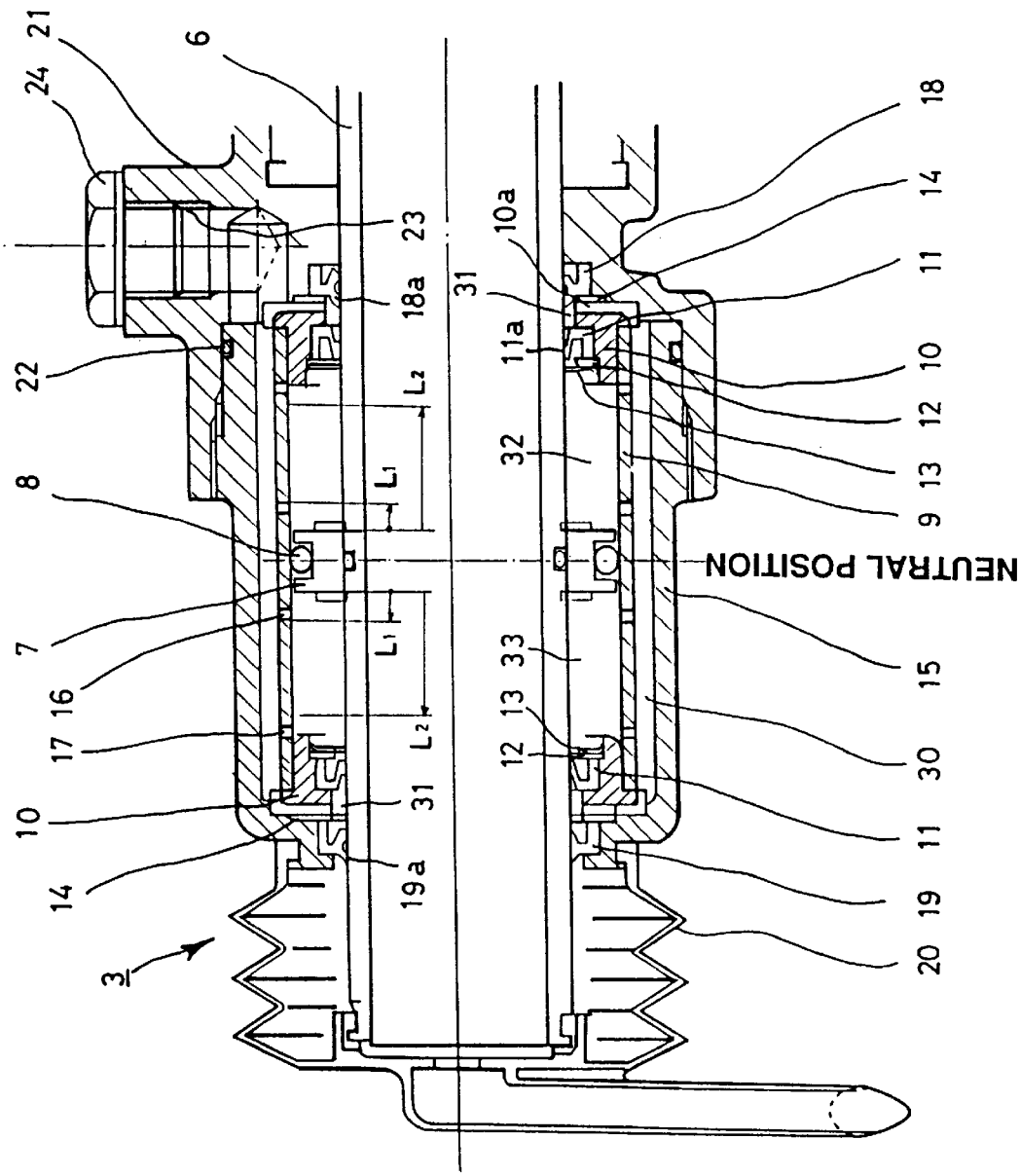
FIG. 2 is a sectional view of a buffer device according to the first embodiment of the invention.

FIG. 2 is a diagram illustrating in detail an enlarged portion of the damper unit 3 of FIG. 1.

A piston 7 for the damper is secured to the outer periphery of the output shaft 6 of the extended booster unit 2. A recessed portion is formed on the outer periphery of the piston 7, and a piston seal 8 is fitted into the recessed portion. A cylinder 9 which is engaged by the piston seal 8, is provided concentrically about the piston 7. The outer diameter portions of a seal housing 10 are inserted in both ends of the cylinder 9. In addition to this, a seal 11 (sealing member) is incorporated in the inner diameter portion of the seal housing 10 by a plate 12 and a clip 13 so as to contact with the output shaft 6.

Figure 3:
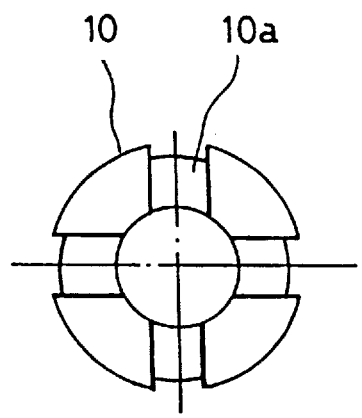
FIG. 3 is a front view of a seal housing according to the first embodiment of the invention.

As shown in FIG. 3, a predetermined number (four in this embodiment) of radially oriented recessed grooves 10a serving as by-passes are formed in a plane where the seal housings 10, which are located at both ends of the cylinder 9, come into contact with a plate 14 which will be described later, so that outer space 30 (a space into which the operation fluid flows or from which the operation fluid flows out via orifice and by-pass) formed by the cylinder 9 and a damper housing 15 and located at the outer periphery of the cylinder 9, is communicated with the inner space 31 (a low-pressure portion) located at the inner periphery of the seal housing 10 divided by the seals 11.

A plurality of small holes 16 are formed in the peripheral wall of the cylinder 9 at a position which corresponds to the synchronization of the transmission, while a plurality of small holes 17, are formed at a position which corresponds to the end of the stroke, so that the passage area is set to decrease as the piston 7 passes the synchronizing position from the neutral position. The small holes 16 and 17 function as an orifice.

At an end on the booster unit side, a rod seal 18 is arranged with the plate 14 so as to come into contact with the output shaft 6 in order to provide seal which excludes compressed air acting on the booster unit 2. A lip 18a of the rod seal 18 exposed to the inner space 31 works as a wiper which prevents viscous fluid (operation fluid) such as silicon oil filled in the inner space 31 from entering into the booster unit 2.

At the end of the side opposite to the booster unit 2, a rod seal 19 is provided so as to contact the output shaft 6 and to prevent the ingress of atmospheric air into the inner space 31. A lip 19a of this rod seal 19 which is exposed to the open air, functions as a wiper which prevents dust infiltrating in small amounts into a boot 20 and from entering the damper unit 3.

The inner space 31 is communicated with the outer space 30 through a recessed groove 10a formed in the seal housing 10 and, hence, the pressure in the inner space 31 is constantly maintained at a low level. Accordingly, the sealing functions of the seal 11 and of the rod seals 18, 19 are not impaired, and reliability is improved.

The above-mentioned components are incorporated in the damper housing 15 and are secured to the end of a housing 21 of the booster unit 2 via a seal 22. Furthermore, the housing 21 is provided with a port 23 (working as a reservoir unit) for storing the viscous fluid in a predetermined amount and for supplying the viscous fluid to the outer space 30. While the damper is in operation, the viscous fluid is stored in an amount, and maintaining a liquid level sufficient for ensuring the damper function. Reference numeral 24 denotes a plug via which viscous fluid can be supplied to port 23.

Thus, when the port 23 equipped with a head tank function, air does not infiltrate or flow into the damper unit 3, and the liquid level is properly maintained at all times, making it possible to obtain stable damper performance. Moreover, since-the port 23 is formed at the end of the housing 21 of the booster unit 2, the damper housing 15 of the damper unit 3 can be rendered structurally simple, making it possible to decrease the weight and cost of the power-shifting device 1 with damper.

The operation of this device is described below.

The interior of the damper housing 15 of the damper unit 3 is filled with a viscous fluid such as silicon oil. When the power-shifting device 1 with damper is operating causing the output shaft 6 to be shifted, i.e., when the piston 7 is moved through a distance L1 from the neutral position to the synchronizing position, the viscous fluid in the cylinder 9 moves from one chamber into the other chamber via the small holes 16, 17 and the outer space 30. In this case, the total flow-path areas of the two small holes 16 and 17 are sufficiently large that the viscous fluid flows through the small holes 16 and 17 creating a small resistance, and the damper effect is small.

When the piston 7 is moved through the distance L1 to the synchronizing position, the piston 7 closes the small hole 16 formed in the cylinder 9, and the area through which the viscous fluid can flow is reduced. In this situation, the transmission undergoes a synchronizing operation, and the output shaft 6 and the piston 7 do not move. Accordingly, the viscous fluid does not flow out through the small hole 17, and the output of the power-shifting device 1 with damper does not substantially decrease.

When the synchronizing operation of the transmission is completed, the load on the power-shifting device 1 rapidly decreases, and the compressed air filled in the booster unit 2 expands and tends to quickly moves the piston 7 up to the stroke end position L2. However, the viscous fluid in the cylinder 9 is drained to the outer space 30 through only the small hole 17 formed in the cylinder 9. Accordingly, the flow rate of the viscous fluid is limited, and the speed is changed in a so-called damped state where the piston 7 is prevented from quickly moving.

The action of the seal 11 will be described in further detail in the damper unit 3 that works as described above.

When the piston 7 moves, for example, toward the right in the drawing, the viscous fluid in the chamber (hereinafter referred to as "damper chamber R") 32 on the right side of the piston 7, is drained into the outer space 30 through small holes 16 and 17. In this case, the viscous fluid in the damper chamber-R 32 is pressurized, whereby a lip 11a of the seal 11 comes into contact with the output shaft 6 and slides while sealing the viscous fluid.

On the other hand, the chamber (hereinafter referred to as "damper chamber L") 33 on the left side of the piston 7 increases in volume as the piston 7 moves toward the right. Accordingly, a negative pressure is produced in the damper chamber-L 33, and the viscous liquid filled in the outer space 30 is sucked into the damper chamber-L 33 through the small holes 16 and 17. Within an acceptable range of negative pressure (viz., limited to prevent the occurrence of cavitation or aeration, or negative pressure affecting the feeling of operation), however, prevents the viscous fluid from flowing into the damper chamber-L 33 sufficiently quickly. Therefore, the seal 11 having a check valve function that will be described below, is used.

That is, the damper chamber-R 32 and the damper chamber-L 33 are each provided with the seal 11 having a so-called check valve function, in which the contact between the output shaft 6 and the lip 11a of the seal 11 in the damper chamber-L 33 is decreased by the negative pressure generated in the damper chamber-L 33 and the lip 11a separates from the output shaft 6, so that the inner space 31 is communicated with the damper chamber-L 33 in the presence of a predetermined negative pressure. In other words, the right and left damper chambers 32 and 33 are each provided with a seal 11 having a sealing portion which usually maintains the damper chamber sealed but deforms and looses its sealing effect only when the viscous fluid flows into the damper chamber. Accordingly, it is made possible to maintain a relatively large passage area having a large diameter doughnut-shape. Therefore, the viscous fluid flows in at a sufficiently large flow rate even under a small negative pressure. This permits the realization of small and simply constructed damper unit 3 without using a check valve which is usually includes a steel ball or like type of valve element, and which has heretofore been used to obtain the same effect as that provided by the present invention. Until the advent of the invention, the damper chamber-R 32 and the damper chamber-L 33 had to be provided with the check valve using a steel ball or like type of valve element in combination with a passage of about 8 mm in diameter.

Figure 4:
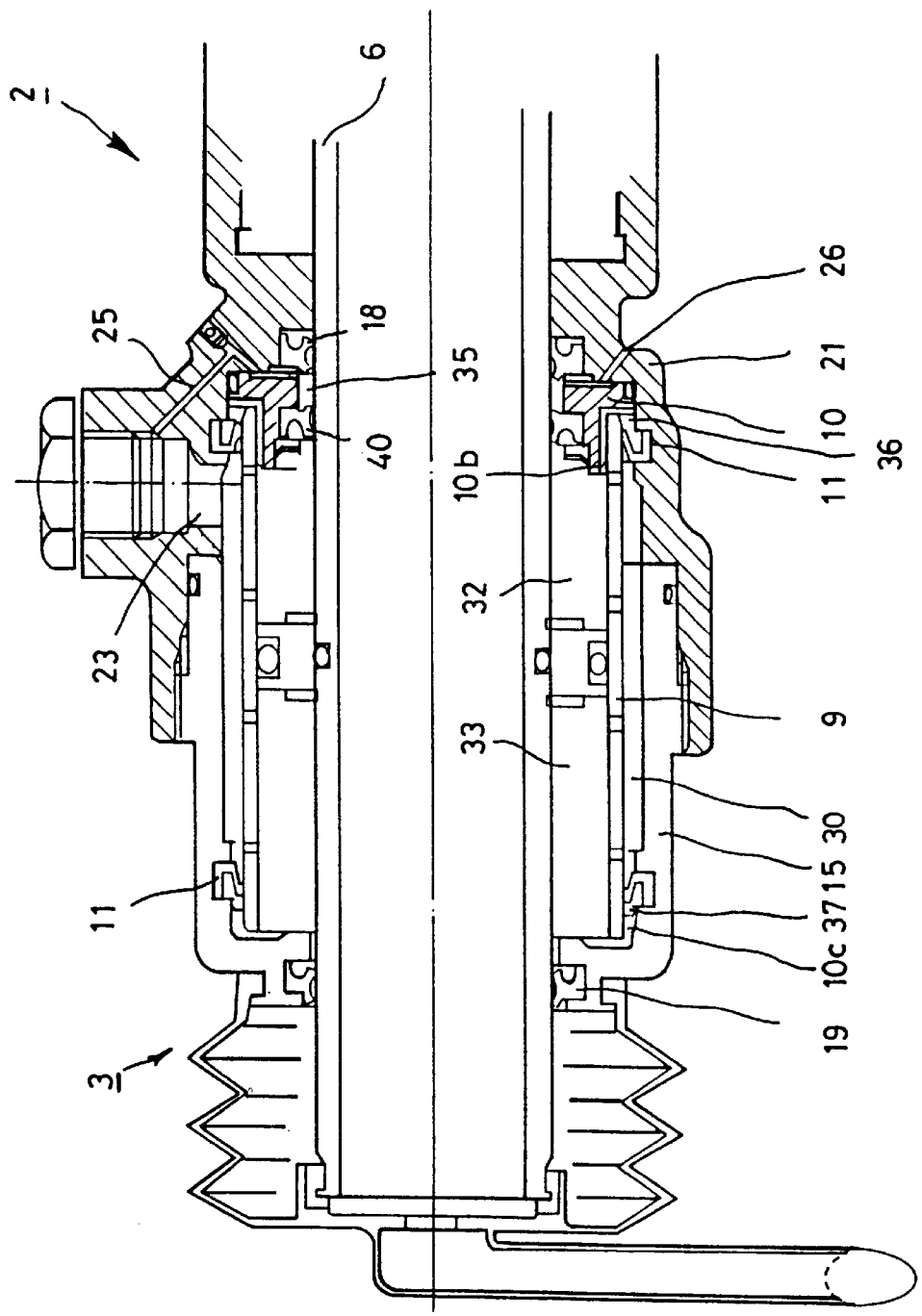
FIG. 4 is a sectional view of the buffer device according to another embodiment of the invention.

FIG. 4 is a diagram illustrating, on an enlarged scale, the arrangement of the damper unit 3 which is different from that of FIG. 2 and which defines another embodiment of the present invention. In this arrangement the seal 11 having a check valve function, a seal 40 on the side of the booster unit 2, and the position for forming the recessed groove 10b in the seal housing 10 are different from those of the damper unit 3 of FIG. 2.

More specifically, the seal 11 having the check valve function is incorporated in the recessed groove formed in the inner wall of the damper housing 15 so as to come into contact with the outer periphery at both ends of the cylinder 9. Furthermore, the seal 40 is disposed in the damper unit 3 on the side of the booster unit 2 so as to come into contact with the output shaft 6.

An outer diameter portion of the seal housing 10 is inserted in the end of the cylinder 9 of the side of the booster unit 2. The seal housing 10 has, in the surface thereof where the cylinder 9 comes into contact with the seal housing 10, a plurality of radially formed recessed grooves 10b (by-passes) for communicating the damper chamber-R 32 with front space 36, which are enclosed by one of the seals 11 and the seal housing 10, and further has a plurality of radially formed recessed grooves 10c (by-passes) for communicating the damper chamber-L 33 with the rear space 37, which are enclosed by the other seal 11 and the damper housing 15.

Moreover, in the housing 21 is a passage 25 which communicates the inner space 35 with a space (port 23 in this embodiment) which is communicated with the outer space (low-pressure portion) 30. With the inner space 35 being thus communicated with the outer space 30, the pressure in the inner space 35 is stabilized, and a decrease in the sealing performance is avoided. Instead of the passage 25, a passage 26 may be formed to communicate the inner space 35 with the outer portion (low-pressure portion) of the damper unit 3.

The functions and effects of this constitution are the same as the functions and effects of the damper unit 3 shown in FIG. 2, and are not redundantly described again.

What is claimed is:

1. An apparatus for operating a transmission comprising a booster for boosting the transmission operation force, and a buffer device for suppressing a rapid shift-change operation caused by a change in the load due to the damper action of a hydraulic damper mechanism, wherein said damper mechanism comprises a damper chamber and an orifice via which an operation fluid flows into and out of the damper chamber, by-passing through which the operation fluid flows into said damper chamber by-passing said orifice, and a sealing member interposed in said by-pass, said sealing member having a sealing portion to seal said by-pass under normal conditions inclusive of when the operation fluid flows out from said damper chamber and to be deformed for releasing the seal only when the operation fluid flows into said damper chamber.

2. An apparatus for operating a transmission according to claim 1, wherein said by-pass is formed in a sealing housing which closes both ends of a cylinder that constitutes said damper chamber.

3. An apparatus for operating a transmission according to claim 1, wherein said damper chamber is formed in two regions of the cylinder divided by a piston that is reciprocatively disposed in said cylinder.

4. An apparatus for operating a transmission according to claim 1, wherein a reservoir unit is provided for storing said operation fluid in a predetermined amount, and said reservoir unit is communicated with the outside of said damper chamber.

5. An apparatus for operating a transmission according to claim 1, wherein a body of said booster and said buffer device are coupled together in series.

6. An apparatus for operating a transmission according to claim 5, wherein said buffer device is disposed concentrically about an output shaft which extends out of said booster device.

7. An apparatus for operating a transmission according to claim 5, wherein a reservoir unit is disposed in the body of said booster near said buffer device.

8. An apparatus for operating a transmission according to claim 1, wherein a space between the sealing member for sealing the interior of said booster and the sealing member for sealing the interior of said damper chamber, is communicated with a low-pressure portion in which the pressure is constantly lower than the pressure of the operation fluid in said damper chamber when the operation fluid is flowing out of said damper chamber.

9. An apparatus for operating a transmission according to claim 8, wherein said low-pressure portion is on the outside of said damper chamber.

10. An apparatus for operating a transmission according to claim 8, wherein said low-pressure portion is located externally of said buffer device.

\* \* \* \* \*